April 21, 1942.   E. A. KEELER   2,280,241
HUMIDITY MEASURING APPARATUS
Filed March 31, 1938

INVENTOR.
EARL A. KEELER
BY
ATTORNEY.

Patented Apr. 21, 1942

2,280,241

UNITED STATES PATENT OFFICE 2,280,241

HUMIDITY MEASURING APPARATUS

Earl A. Keeler, Norristown, Pa., assignor to The Brown Instrument Company, Philadelphia, Pa., a corporation of Pennsylvania Application March 31, 1938, Serial No. 199,122

12 Claims. (Cl. 73—337)

This invention relates to instruments useful in measuring and/or controlling the degree of moisture in an atmosphere to which an element of the instrument is exposed.

A general object of the invention is to provide measuring and/or controlling apparatus of the type referred to above which is characterized by the simplicity and effectiveness of its operating mechanism.

A further and more specific object of the invention is to provide an instrument of the type referred to above in which a hygroscopic element exposed to an atmosphere under measurement biases a device towards and away from a predetermined position responsively to variations in the degree of moisture in that atmosphere and a measure of said moisture is had by ascertaining the force necessary to restore and maintain said device in said predetermined position.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of my invention.

Figure 1:
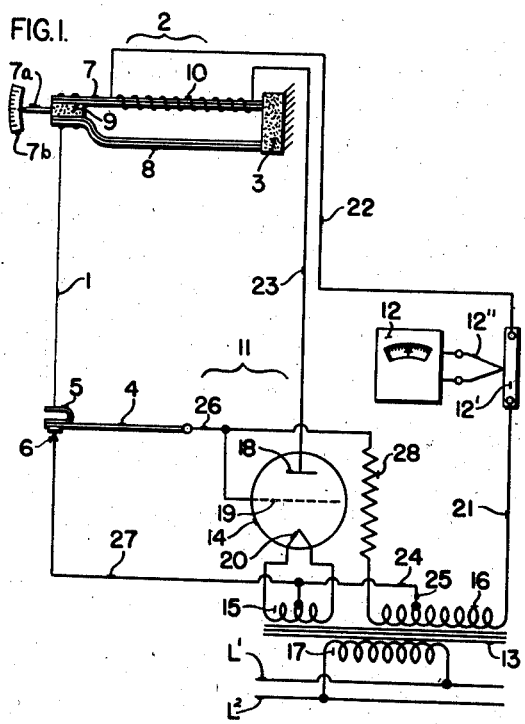
Fig. 1 is a more or less diagrammatical view illustrating one form of the invention.

The embodiment of my invention illustrated in Fig. 1 of the accompanying drawings comprises an instrument for measuring and exhibiting the degree of moisture in an enclosure or other space responsively to the expansion or contraction of a strand of suitable animal or vegetable fibre having the property of varying in length when subjected to varying hygroscopic conditions. Human hair, for example, has this property of changing in length in accordance with the amount of moisture in the atmosphere thereabout, and in Fig. 1 I have shown a strand of human hair 1 suspended at one end from a device 2, to be described, which is fixedly mounted on a stationary bracket 3. Hair element 1 supports a switch member 4 at the other end thereof, and is connected thereto by means of a spring 5 which may be manually bent and is provided for facilitating the adjustment of the position of switch member 4.

Switch member 4 is positioned in cooperative relation with a stationary contact member 6 and is adapted to move into and out of engagement with the latter accordingly as the length of hair element 1 becomes greater or less than a predetermined value responsively to changes in the moisture surrounding it. In referring to a length of "predetermined value" of hair element 1, I contemplate a value which is automatically and continuously reset and which is desirably reset through the action of the measuring apparatus itself. For example, on a change in the moisture content of the atmosphere surrounding hair element 1 and a consequent change in the length of the latter, the switch member 4 is actuated into or out of engagement with the contact member 6, and as a result of such engagement or disengagement, the device 2 is actuated, by means to be described, in an upward or downward direction as required to compensate for the change in length of hair element 1 to thereby restore the switch member 4 to its normal positional relation with the contact member 6.

The positional relation that normally exists between contact members 4 and 6 is such that these members are in chattering engagement so that normally the periods during which the device 2 is successively energized for operation in opposite directions are so brief that the device 2 is given no movement of significant extent. Upon the occurrence of a change in the length of hair element 1, however, the engagement or disengagement of contact members 4 and 6 is sustained for a longer period, whereby the device 2 will be actuated in the proper direction to restore the normal chattering relation between the contact members.

The device 2 may be termed a "heat motor" for reasons which will become apparent and includes a pair of bimetallic strips 7 and 8 both of which are secured by an end to the stationary bracket 3 and separated from each other by a suitable distance. The free ends of the strips 7 and 8 are joined by a fiber or other heat insulating spacer 9. The strips 7 and 8 are each composed of two metals having different temperature coefficients of expansion which are welded, riveted, or soldered together along their entire length. Such strips are commonly known as bimetallic elements and have the property of warping when subjected to the influence of heat. The elements 7 and 8 are desirably so connected to the spacer 9 that they are free to move longitudinally with respect to the spacer and thereby to warp without restricting the action of each other.

The means referred to above for actuating the device 2 for movement in a direction compensating for a change in the length of hair element 1 includes a heating coil 10 associated with the bimetallic strip 7. Heating coil 10 is connected in the output circuit of an electronic amplifier 11, the current flow through which is adapted to be controlled by the contact members 4 and 6, which, as shown, are connected to the amplifier input terminals. When contact members 4 and 6 are in engagement, amplifier 11 is adapted to supply a predetermined value of current to heating coil 10, but when the contact members are out of engagement, the current supplied coil 10 is materially reduced and may even assume a zero value. Bimetallic strip 7 is so arranged that when coil 10 is energized it warps in an upward or clockwise direction as seen in Fig. 1, and conversely when the heating coil is energized to a lesser extent or totally de-energized, as the case may be, strip 7 is permitted to cool and moves in a downward or counterclockwise direction. It will thus be noted the action of device 2 may be compared to that of a motor and since it is temperature responsive it may be termed a "heat" motor.

Thus, on a change in the relative humidity of the atmosphere surrounding hair element 1 and a consequent change in the length thereof, the bimetallic strip 7 is heated to a greater or lesser extent depending upon whether the contact members 4 and 6 are sustained in engagement or out of engagement and accordingly warps in an upward or downward direction, and effects a compensating action which restores the contact member 4 to the position in which it is in chattering engagement with the contact 6. As will be clearly apparent, the average current value through heating coil 10 which is required to maintain the bimetallic strip 7 in a position such that the contact member 4 will be in chattering engagement with contact 6, will vary in accordance with the length of hair element 1, and, in this form of my invention, I obtain a measure of the length of hair element 1 and thereby of the degree of moisture of the atmosphere thereabout by measuring the average current value supplied heating coil 10 by means of a meter 12. As illustrated, the current to be measured by the meter 12 is passed through a resistor element 12' and the heat generated in the resistance element generates a voltage in a thermocouple 12'', the terminals of which are connected to the meter 12, which actuates the meter and causes deflection of its deflecting element to an extent determined by the magnitude of the average current value passing through the resistance element 12'. It is noted that while there are actually only two current values at any instant which can flow through the heating coil 10 and the resistance 12, that is, a minimum current value when the contacts 4 and 6 are out of engagement and a maximum current value when the said contacts are in engagement, the average of these two current values over a given period of time will be some intermediate value determined by the total length of time and/or frequency said contacts are in engagement during that period of time. This intermediate current value is the value intended when the term average current value is employed herein. The measurement of such intermediate or average current value is rendered possible by the meter 12 because the temperature of the resistance 12' does not change instantaneously on a change in current flow therethrough due to its inherent characteristic of sluggishness in response. Meter 12 may be a thermocouple ammeter, as shown, or may be a hot wire or other suitable type, and is preferably calibrated in terms of moisture to thereby provide a direct indication of the degree of moisture in the atmosphere surrounding the hair element. It will be apparent the conductors connecting the terminals of the meter 12 to the amplifier 11 may be extended to any desired length, thereby permitting the indication of the degree of moisture to which the hair element is exposed at a point remote from the latter.

In instruments employing bimetallic elements it will be apparent to those skilled in the art that changes in the ambient temperature of the atmosphere about the bimetallic strip 7 will cause warping of the latter independently of the heating coil 10 and in order to compensate for such changes in ambient temperature, the bimetallic strip 8 referred to hereinbefore is provided. The strip 8 is preferably composed of the same metals which make up the strip 7, but is reversely arranged with respect to the latter so that on a rise in ambient temperature, for example, the strips will be actuated for movement in opposite directions and consequently no movement of the device 2 will result. With this arrangement, therefore, changes in ambient temperature will have no effect on the accuracy of the instrument.

As illustrated, the amplifier 11 includes a transformer 13 and an electronic valve 14. The transformer 13 supplies power to the system and is a combination step-up and step-down transformer comprising a low voltage secondary winding 15, a high voltage secondary winding 16, and a line voltage primary winding 17 having its terminals connected to alternating current supply conductors $L^1$ and $L^2$.

The electronic valve 14 is shown as a triode type and includes an anode 18, a control grid 19, and a filament cathode 20. The low voltage transformer secondary winding 15 is connected to the filament cathode 20 and supplies energizing current thereto. Anode voltage is supplied valve 14 from the high voltage secondary winding 16 through a circuit which may be traced from the right hand terminal of the winding to a conductor 21, through the resistance element $12^1$, to a conductor 22, the heating coil 10 and therethrough to a conductor 23, the anode 18 and cathode 20 of valve 14, and a conductor 24 to a tap 25 on the transformer secondary winding.

As referred to hereinbefore, the means for controlling the conductivity of valve 14 and thereby the energization of heating coil 10 includes the stationary contact 6 and the cooperating switch member 4. As illustrated, switch member 4 is connected to the control grid 19 by a conductor 26, and the contact 6 is connected by a conductor 27 to a center tap on the low voltage transformer secondary winding 15. When the switch member 4 is out of engagement with contact 6, a potential of such polarity is impressed on the control grid 19 by a portion of the secondary winding 16 through a resistance 28 that the grid potential relative to the cathode potential is such that the conductivity of the valve is a minimum. The circuit employed for so biasing the control grid 19 may be traced from the left hand terminal of the transformer secondary winding 16 to the resistor 28 and therethrough to the control grid 19.

When the contact members 4 and 6 are in engagement, however, it will be noted the bias voltage provided by the secondary winding 16 is shunted out and the potential of the control grid 19 will then be raised to that of the cathode 20 and may even be swung slightly positive with respect to the cathode potential, and as a result, the current conducted by the valve will be materially increased.

It is noted that since an alternating voltage is impressed on the anode circuit of valve 14 that the current conducted thereby will be pulsating. In order to provide a measure of the moisture content of the atmosphere surrounding hair element 1 in terms of the current supplied heating coil 10, a meter capable of indicating average values of current flow, such as meter 12 previously described, must be employed. It should be particularly noted, however, that a pointer 7a attached to the elements 7, 8, as shown in Fig. 1, may serve to indicate on a suitable scale 7b the value of the condition in lieu of or in addition to the meter 12.

Figure 2:
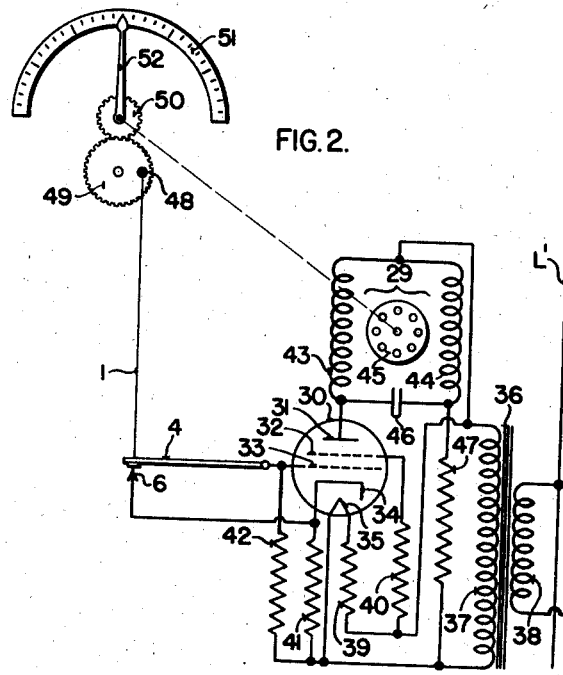
Figs. 2-4 illustrate modifications of the arrangement of Fig. 1.

In Fig. 2 I have illustrated, more or less diagrammatically, a modification of the Fig. 1 arrangement in which the heat motor 2 and meter 12 may be dispensed with and in which the switch member 4 is restored to a position of chattering engagement with the contact 6, on departure therefrom as a result of a change in the length of hair element 1, by a reversible electrical motor 29. In accordance with this arrangement the reversible motor 29 is selectively controlled for rotation in one direction or the other by an electronic valve 30, which in turn, is controlled by the contact members 4 and 6.

Valve 30 is a heater type tetrode preferably of the type known commercially as beam power amplifier valves, for example, a 25L6 type valve, and includes an anode 31, a screen grid 32, a control grid 33, a cathode 34 and a heater filament 35. Energizing voltage is supplied the valve 30 from a transformer 36 which, as shown, includes a secondary winding 37 and a primary winding 38 having its terminals connected to the supply conductors L¹ and L². Energizing current is supplied the filament 35 from the transformer secondary winding 37 through a circuit which may be traced from the lower terminal of the secondary winding to the filament, and a resistor 39 to the upper terminal of the winding. Resistor 39 is employed for limiting the flow of current to the filament 35 and is so chosen that the voltage impressed on the filament will be the desired value. Screen grid 32 is connected to the upper terminal of transformer secondary winding 37 through a resistance 40 of suitable value, and cathode 34 is connected to the lower terminal of the secondary winding through a biasing resistor 41. Control grid 33 is connected to the negative end of resistor 41 through a resistor 42.

Reversible motor 29 is of the well known capacitor induction variety having field windings 43 and 44 spaced in quadrature with each other, and so disposed relatively to a squirrel cage rotor 45 that half of each winding is at diametrically opposite sides of the rotor, and also includes a condenser 46 of suitable capacity. In the normal operation of such motors the magnetic fields set up in the rotor by the windings 43 and 44 have a phase displacement of not more than 90° whereby the fields form together a rotating field such as to cause rotation of the rotor in one direction or the other accordingly as the field set up by the winding 43 is displaced in the forward or the backward direction relatively to the field set up by the winding 44.

Winding 43 is connected in a series circuit with the anode to cathode resistance of valve 30 and the cathode biasing resistor 41 across the transformer secondary winding 37, and winding 44 is connected in a series circuit with a fixed resistor 47 thereacross. Condenser 46 is connected between the anode 31 of valve 30 and the point of connection of resistor 47 and the winding 44. Thus, when the anode to cathode resistance of valve 30 is approximately equal to the resistance of resistor 47, the impedance of the circuit paths including the windings 43 and 44 will be approximately equal so that the terminals of condenser 46 will be at the same potential. As a result the magnetic fields set up by the windings 43 and 44 will be approximately in phase and consequently the rotor 45 will remain stationary. When the anode to cathode resistance of valve 30 is increased or decreased, however, the terminals of condenser 46 will be at different potentials so that in effect the condenser will be connected in a series circuit with one motor winding 43 or 44 in shunt to the other motor winding, and as a result the magnetic field set up by one motor winding will be displaced in the forward or backward direction with respect to the magnetic field set up by the other winding and the rotor 45 will be actuated for rotation in a corresponding direction.

The means for controlling the conductivity of valve 30 includes a pair of contacting members 4 and 6 which may be identical to the correspondingly identified parts of Fig. 1. Switch member 4 is supported from one end of hair element 1 and the upper end of the latter is fixedly connected to a stud 48 carried on the face of a gear 49. Gear 49 is in cooperative relation with a gear 50 and the latter is connected through suitable gearing (not shown) to the rotor 45 of motor 29. Stud 48 is displaced a suitable distance from the axis of rotation of gear 49 so that when gear 50 and consequently gear 49 is rotated in one direction or the other as a result of motor rotation, hair element 1 will be moved in a downward or upward direction, and accordingly switch member 4 will be moved into or out of engagement with contact 6.

Thus, on a change in the length of hair element 1, for example, on an increase thereof, switch member 4 will be moved into engagement with contact 6 and negative charges which have been permitted to accumulate on control grid 33 leak off and accordingly the conductivity of valve 30 is increased. It is noted that when the term conductivity is used in connection with valve 30 the effective conductivity as regards the tendency for energizing motor 29 for rotation is intended. Since an alternating voltage is impressed on the anode circuit of valve 30, the latter will conduct pulsating current and as the amplitude of the pulsating current rises above a predetermined value determined by the magnitude of resistor 47, the rotor 45 of motor 29 will be urged to rotation in one direction or the other and in the case above mentioned, will cause rotation of gear 49 in a counterclockwise direction to thereby move switch member 4 out of engagement with contact 6.

When switch member 4 is out of engagement with contact 6, negative charges will be permitted to accumulate on the control grid 33 and a decrease in conductivity of valve 30 will result whereupon motor 29 will be energized for rotation in the opposite direction. Switch member 4 will then again move into engagement with contact 6 and motor 29 will be energized for rotation in the opposite direction. As will be clearly apparent, the system will quickly come to an equilibrium condition in which the contact members 4 and 6 are in chattering engagement and motor 29 will then be actuated for rotation in opposite directions in rapid alternation and will remain stationary. Upon an increase or decrease in the length of hair element 1, however, engagement or disengagement of contact members 4 and 6 will be sustained for a substantial interval and accordingly motor 29 will be actuated for rotation in one direction or the other and will cause movement of the switch member 4 in the proper direction to reestablish a chattering engagement between the contacts.

In this arrangement means are provided in the form of a suitably calibrated scale 51 and an associated pointer 52 carried by the gear 50 for indicating the degree of moisture content of the atmosphere to which the hair element 1 is subjected.

Figure 3:
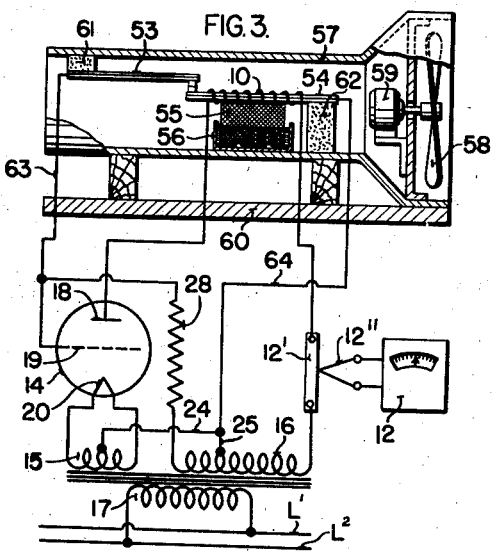

In Fig. 3 I have illustrated a further modification of the Fig. 1 arrangement wherein the hair element 1 and the compensating bimetallic strip 8 may be dispensed with and in which a measure of the degree of moisture in an atmosphere is had by measuring the "wet" and "dry" temperatures of the atmosphere. That is to say, a temperature measuring element which is dry and from which the evaporation of moisture is negligible, and a temperature measuring element which is maintained in a moistened state, and from which moisture will evaporate at a rate determined by the moisture content of the atmosphere to which the elements are subjected, are provided for obtaining a measure of the relative humidity of that atmosphere.

The "dry" temperature measuring element referred to comprises a bimetallic strip 53, and the "wet" temperature measuring element comprises a bimetallic strip 54 which is maintained in a moistened state by virtue of a wick 55 which dips into water contained in a vessel 56. The elements 53 and 54 may be enclosed in the space the humidity of which is under measurement, but for purposes of obtaining an average measure in a large enclosed space, they may be placed in a casing 57 through which gas is drawn from that space by a fan 58 driven by a motor 59, as illustrated. The casing 57 may be mounted on a suitable base 60, which may be supported in the enclosure or space (not shown) which contains the gas to be tested for humidity.

As illustrated, element 53 is fixedly mounted by its left hand end to an insulating block 61 and element 54 is fixedly mounted by its right hand end to an insulating block 62. Blocks 61 and 62 are supported in any convenient manner in the casing 57. The other ends of elements 53 and 54 are provided with contacts which are moved into and out of engagement with each other as the moisture content of the gas passing through casing 57 changes.

Element 53 is connected by a conductor 63 to the control grid 19 of an electronic valve 14 and element 54 is connected by a conductor 64 to the cathode 20 thereof so that as the elements move into and out of engagement with each other the conductivity of valve 14 is varied.

When the relative humidity of the gas passing through the casing 57 is low, evaporation from the wick 55 will assist the dissipation of heat from element 54, and thereby maintain the warping of the element at a lower degree than would be the case if its temperature were allowed to rise. Since the evaporation from element 53 is small, however, the temperature of the latter will remain substantially constant if a constant temperature prevails and notwithstanding changes in humidity. When the relative humidity rises, however, evaporation from wick 55 will decrease with a resulting decrease in the rate of dissipation of heat therefrom and consequently the temperature of the element 54 will rise, and the degree to which it is warped will increase.

In order to compensate for changes in relative humidity with changes in temperature of the gas, the bimetallic strips 53, and 54 are so constructed that on a given temperature rise the strip 54 will warp to a greater degree than the strip 53, and the extent to which it does is precisely that required to compensate for the change in relative humidity occurring as a result of the temperature change.

A heating coil 10 connected in the output circuit of valve 14 is provided for so heating element 54 that on a change in temperature of the latter as a result of a change in the relative humidity of the gas, the temperature of the element 54 will be restored to that value in which the element 54 is in chattering engagement with the element 53. In other words, elements 53 and 54 are normally in chattering engagement but upon a change in the relative humidity of the gas passing through casing 57 and a resulting sustained engagement or disengagement of the elements, the heating effect of coil 10 will be changed in the proper direction to so actuate element 54 that a chattering engagement between the elements will be restored. It will be clear the supply of energizing current to coil 10 will then provide a measure of the relative humidity of the gas drawn through casing 57, and a direct indication thereof may be had by measuring that current by a suitably calibrated meter 12.

Figure 4:
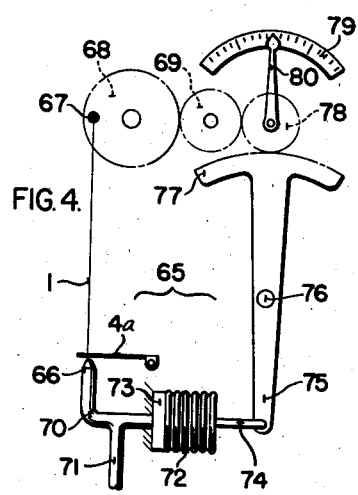

In Fig. 4 I have illustrated, more or less diagrammatically, a further modification of the arrangement of Fig. 1 in which the contacting elements 4 and 6 and the associated electrical apparatus of that arrangement may be dispensed with and a device 4a and a fluid motor 65 employed in lieu thereof. In accordance with this arrangement, the device 4a is moved toward and away from a predetermined position as the hair element 1 lengthens and shortens and is restored to said predetermined position by the fluid motor 65. As described more in detail hereinafter, the fluid motor 65 is selectively actuated for movement in one direction or the other responsively to movement of the device 4a from a predetermined position relatively to an air nozzle 66 and operates to restore said device to said predetermined position on deviation therefrom.

The device 4a is preferably in the form of a flapper and, as illustrated, one end is pivoted on a stationary support (not shown) and the other end is connected to the lower end of hair element 1 the upper end of which is connected to a stud 67 carried on the face of a gear 68. Gear 68 is in cooperative relation with a gear 69 and the latter is connected through gearing to be described to the fluid motor 65. Stud 67 is displaced a suitable distance from the axis of rotation of gear 68 so that when the latter is rotated as a result of actuation of the fluid motor 65, hair element 1 will be moved in a downward or upward direction, and accordingly the device 4a will be moved toward or away from the nozzle 66.

Nozzle 66 is connected by a pipe 70 to a source of air supply shown as a pipe 71 which is also connected to one end of a bellows 72. Bellows 72 is rigidly connected at this end to a stationary support 73 and is connected by its other end to one end of a link 74 the other end of which is connected to the lower end of a lever 75. Lever 75 is pivoted for rotation at a point 76 intermediate its ends and carries an arcuate gear section 77 at its upper end. The gear section 77 is in cooperative relation with a gear 78 which meshes with and is adapted to drive the gear 69.

Thus, on a change in the length of hair element 1, for example, on an increase in length thereof, the flapper 4a will move toward the nozzle 66 and reduce the flow of air therefrom whereupon pressure will build up in the bellows 72 which will operate to extend its length and thereby cause rotation of the lever 75 in a counterclockwise direction. Such rotation of lever 75 will cause rotation of the gear 68 in a clockwise direction and thereby movement of the flapper 4a away from the nozzle 66 to thereby reduce the restrictive action of the flapper on the air issuing from the nozzle. As a result, the pressure in bellows 72 will be reduced and the system will come to an equilibrium condition with the lever 75 in a new position corresponding to the then length of hair element 1.

In this arrangement means are provided in the form of a suitably calibrated scale 79 and an associated pointer 80 carried by the gear 78 for indicating the degree of moisture content of the atmosphere to which the hair element 1 is exposed.

It is noted that on a change in the length of hair element 1, the flapper 4a will not return to precisely the exact position it occupied prior to the change, but for all practical purposes the range of deviation of the positions it occupies throughout the range of measurement of the instrument is so narrow as to be negligible.

Figure 5:
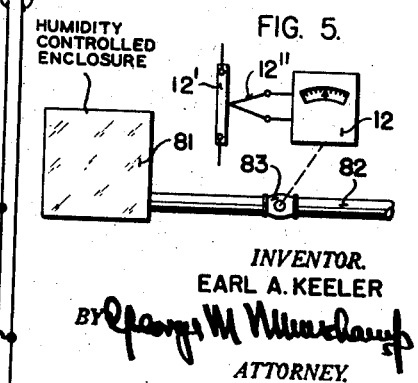
Fig. 5 is a diagrammatical representation of the use of the invention in a control system.

It will be apparent the apparatus of my present invention may be employed to operate a control valve or rheostat for controlling the humidity of the atmosphere to which the hair element 1 is exposed. For example, as shown in Fig. 5, an enclosure 81, in which the hair element 1 of Fig. 1 is exposed, is connected by a pipe 82 to a source of moisture laden air and the supply of such air to the enclosure is adapted to be regulated by a valve 83, the adjustment of which is effected automatically in any well known manner by means responsive to the deflection of the deflecting element of the meter 12 from a predetermined position. The mechanical connection of the automatic adjusting means referred to, to the valve 83 is such as to increase and decrease the supply of moisture laden air to the enclosure 81 as the moisture content of the latter drops below or rises above a predetermined value.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Measuring apparatus including an element sensitive substantially only to changes in the moisture content of a space in which it is exposed regardless of the thermal conductivity of the fluid within said space and deformable directly in the accordance with changes in the moisture content of said space, a device under control of said element and movable from a predetermined position thereby, said device at all times placing a predetermined load on said element, means for resetting said device to said predetermined positon on departure therefrom without changing the load on said element including means controlled by said device, and means for measuring the extent to which said device is reset.

2. Measuring apparatus including an elongated hygroscopic element adapted to expand and contract with changes in humidity of a space in which said element is exposed, a device under control of said element and movable from a predetermined position thereby, said device at all times placing a predetermined load on said element, means under control of said device for resetting said device to said predetermined position on departure therefrom without changing the load on said element, and means for measuring the extent to which said device is reset.

3. Measuring apparatus including an elongated hygroscopic element adapted to expand and contract with changes in the humidity of a space in which said element is exposed, a relatively fixed contact, a device comprising a contact and normally occupying a predetermined position in which it is in chattering engagement with said contact but movable from said position under control of said element, said device at all times placing a predetermined load on said element, means connected to said contacts and operable in one sense when said contacts are in engagement and operable in another sense when said contacts are out of engagement for resetting said device to said predetermined position on departure therefrom, and means for measuring the extent to which said device is reset.

4. Measuring apparatus including an elongated hygroscopic element adapted to expand and contract with changes in humidity of a space in which said element is exposed, a movable support for one end of said element, a lever connected to the other end of said element, a fulcrum about which said lever is arranged to rotate in accordance with the expansion and contraction of said element, a relatively fixed contact, a contact carried by the free end of said lever and in chattering engagement with said relatively fixed contact when said lever is in a predetermined position, means under control of said contacts for resetting said lever to said predetermined position on departure therefrom including means controlling the position of said movable support, and means for measuring the extent to which said lever is reset.

5. Measuring apparatus including an elongated hygroscopic element adapted to expand and contract with changes in humidity of a space in which said element is exposed, a movable support for one end of said element, a lever connected to the other end of said element, a fulcrum about which said lever is arranged to rotate in accordance with the expansion and contraction of said element, a relatively fixed contact, a contact carried by the free end of said lever and in chattering engagement with said relatively fixed contact when said lever is in a predetermined position, means under control of said contacts for resetting said lever to said predetermined position on departure therefrom including means controlling the position of said movable support, and measuring means associated with said movable support.

6. Measuring apparatus including an elongated hygroscopic element adapted to expand and contract with changes in humidity of a space in which it is exposed, a movable support for one end of said element, a lever connected to the other end of said element, a fulcrum about which said lever is arranged to move in accordance with the expansion and contraction of said element, a contact carried by the free end of said lever, a relatively fixed contact associated with said first mentioned contact and adapted to be engaged thereby, an electronic valve having an input circuit and an output circuit, a connection between said contacts and the input circuit of said valve whereby the current flow through the electronic valve is controlled, measuring means, and means connected in the output circuit of said valve to control the movement of said movable support to bring the contacts into chattering relation to each other upon a departure therefrom and to control said measuring means.

7. Measuring apparatus including an elongated hygroscopic element adapted to expand and contract with changes in the humidity of a space in which said element is exposed, a heater element for positioning said hygroscopic element, a relatively fixed contact, a device comprising a contact and normally occupying a predetermined position in which it is in chattering engagement with said relatively fixed contact but movable from said position under control of said element, means for resetting said device to said predetermined position on departure therefrom including electronic valve means having an input circuit under control of said contacts and an output circuit including said heater element, and means for measuring the average value of current in said output circuit.

8. Measuring apparatus including an elongated hygroscopic element adapted to expand and contract longitudinally with changes in the humidity of a space in which said element is exposed, a movable device supporting one end of said element, a pivoted lever connected by the other end of said element, said pivoted lever at all times placing a predetermined load on said element, means operable upon said movable device to control the motion of said movable device including amplifying means the operation of which is governed in accordance with the position of said lever, and measuring means controlled by said amplifying means.

9. Measuring apparatus including a hair element adapted to expand and contract with changes in the humidity of a space in which said element is exposed, a movable device supporting said element, a pivoted lever adapted to be deflected from a predetermined position under control of said element, said pivoted lever at all times placing a predetermined load on said element, means to control the motion of said movable device for resetting said lever to said predetermined position on departure therefrom including means the operation of which is governed in accordance with the position of said lever and measuring means controlled by said controlling means.

10. Measuring apparatus including a hair element adapted to expand a contract with changes in the humidity of a space in which said element is exposed, a movable device supporting one end of said element, a pivoted lever connected by the other end of said element, a relatively fixed contact, a contact controlled by said lever and normally in chattering engagement with said first mentioned contact, means to control the motion of said movable device to bring the contacts into chattering relation to each other upon a departure therefrom, and electronic valve means under control of said contacts to control said last mentioned means.

11. Apparatus including in combination, an elongated hygroscopic element adapted to expand and contract with changes in humidity of a space in which it is exposed, a movable support for one end of said element, a lever connected to the other end of said element, a fulcrum about which said lever is arranged to move in accordance with the expansion and contraction of said element, a contact carried by the free end of said lever, a relatively fixed contact associated with said first mentioned contact and adapted to be engaged thereby, an electronic valve having an input circuit and an output circuit, a connection between said contacts and the input circuit of said valve whereby the current flow through the electronic valve is controlled, and means connected in the output circuit of said valve to control the movement of said movable support to bring the contacts into chattering relation to each other upon a departure therefrom.

12. Apparatus including in combination, an elongated hygroscopic element adapted to expand and contract longitudinally with changes in the humidity in a space in which said element is exposed, a movable device supporting one end of said element, a pivoted lever connected by the other end of said element, said pivoted lever at all times placing a predetermined load on said element, and means operable upon said movable device to control the motion of the latter including amplifying means the operation of which is governed in accordance with the position of said lever.

EARL A. KEELER.